United States Patent
Shaikh et al.

[11] Patent Number: 5,847,958
[45] Date of Patent: Dec. 8, 1998

[54] RAPIDLY MAKING A CONTOURED PART

[75] Inventors: Furgan Zafar Shaikh, Troy; Martin Andrew Brogley, Allen Park; Craig Edward Burch, West Bloomfield; Gerry A. Grab, Trenton; Robert Walter Grenkowitz, Washington; Robert Francis Novak, Farmington Hills; Michael Raymond Rigley, Westland, all of Mich.

[73] Assignee: Ford Global Technologies, INc., Dearborn, Mich.

[21] Appl. No.: 873,433

[22] Filed: Jun. 12, 1997

Related U.S. Application Data

[63] Continuation-in-part of Ser. No. 158,054, Nov. 26, 1993.

[51] Int. Cl.$^6$ ........................................... G06F 19/00
[52] U.S. Cl. .................. 364/468.26; 364/468.24; 364/468.25; 364/468.03; 364/474.29; 364/474.24
[58] Field of Search .................. 364/474.24, 474.29, 364/468.03, 468.24, 468.25, 468.26

[56] References Cited

U.S. PATENT DOCUMENTS

| | | | |
|---|---|---|---|
| 4,675,825 | 6/1987 | DeMenthon | 364/474.24 |
| 4,736,306 | 4/1988 | Christensen et al. | 364/171 |
| 4,937,768 | 6/1990 | Carver et al. | 364/191 |
| 4,979,224 | 12/1990 | Maiocco et al. | 382/8 |
| 5,031,483 | 7/1991 | Weaver | 76/107.1 |
| 5,058,026 | 10/1991 | Kunii et al. | 364/474.2 |
| 5,177,689 | 1/1993 | Kinasi et al. | 364/474.26 |
| 5,243,514 | 9/1993 | Mijukami | 364/191 |
| 5,249,135 | 9/1993 | Fujita | 364/474.21 |
| 5,351,196 | 9/1994 | Sowar et al. | 364/474.24 |

FOREIGN PATENT DOCUMENTS

A-4124961 1/1993 Germany.

Primary Examiner—Paul P. Gordon
Attorney, Agent, or Firm—Joseph W. Malleck

[57] ABSTRACT

Method of rapidly producing a contoured part, comprising: designing a computer graphic model of the part, sectioning the graphic model into graphic members which are at least one of blocks or slabs, carving a solid member (14–150 mm in thickness) for each of the graphic members, the solid member being proportion to and enveloping such graphic members, the carving being carried out by accessing two or more sides (opposite sides) of such solid member to at least essentially duplicate the corresponding graphic member, and securing the carved solid members together to replicate the graphic model as a usable unitary part.

20 Claims, 9 Drawing Sheets

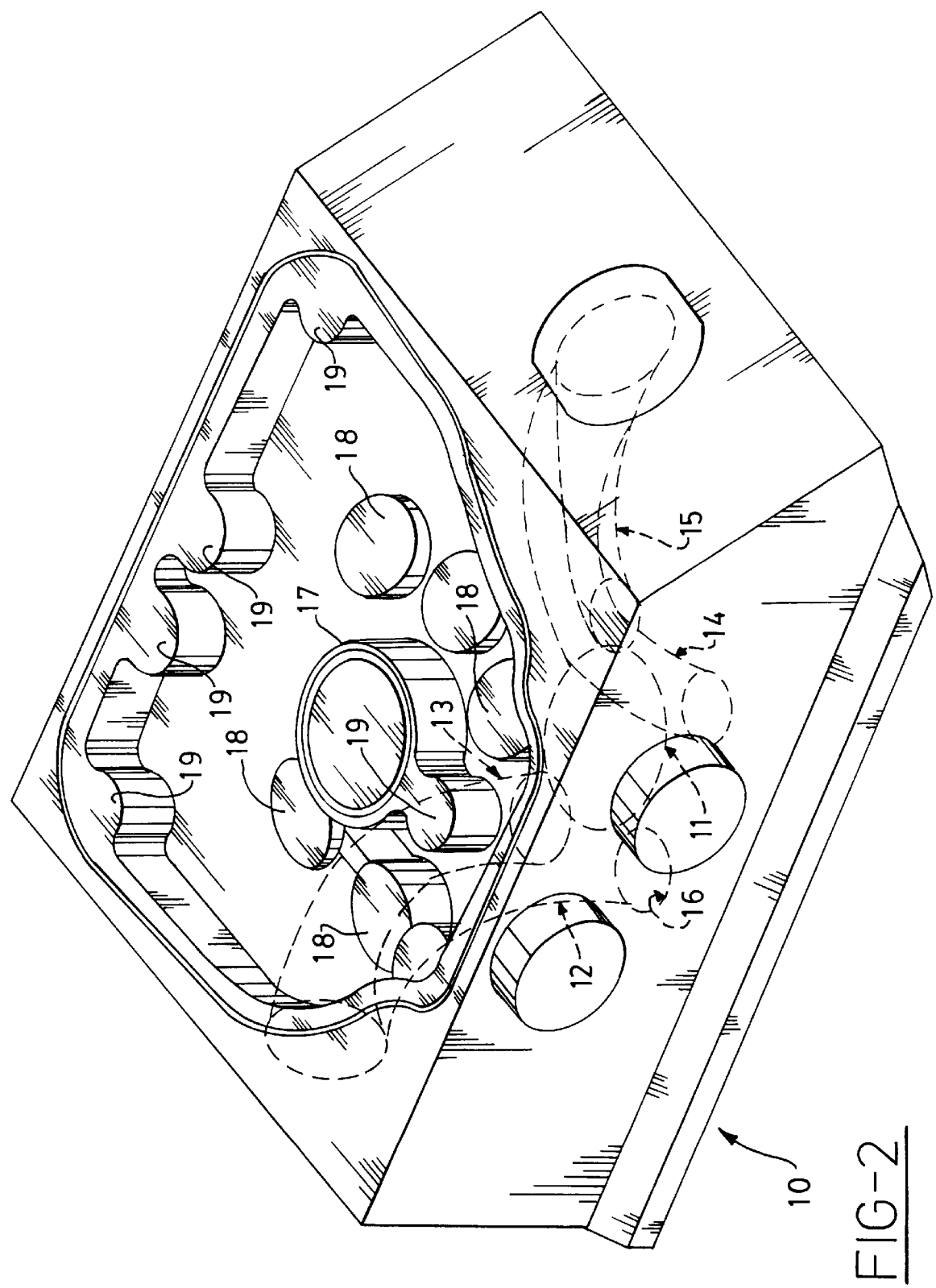

COMBINATION OF SLICES

RAPIDLY MAKING A CONTOURED PART

RELATED APPLICATIONS

This is a Continuation-in-Part application of U.S. Ser. No. 08/158,054 entitled "Rapidly Making A Contoured Part" filed Nov. 26, 1993 (pending as of Jul. 7, 1998).

BACKGROUND OF THE INVENTION

1. Technical Field

This invention relates generally to manufacturing and shaping of parts constituted of reasonably rigid material, and more particularly to rapid prototyping of such parts by sectioned object machining which facilitates free-form fabrication.

2. Discussion of the Prior Art

It is becoming paramount that prototype parts and their associated tools be fabricated faster in free-form, at lower cost, particularly in metal shapes, have superior surface finish and require little or no remachining. Technology attempting to meet these objectives fall into generally four categories: extruding, spraying, curing and laminate forming. Each has significant disadvantages that fail to meet all of the objectives.

Extrusion uses a heated nozzle to extrude hot wax or other polymer filaments, such as nylon, into a shape. It cannot be used to make metal parts; it is fragile, subject to delamination, and is expensive.

Spraying can be either (i) an emulsion type where a binder is sprayed onto a metal powder which is subsequently laser sintered, or (ii) thermally sprayed at high temperature using a metal powder to produce a shape. Spraying is expensive, slow and produces a mediocre surface finish which is porous.

Curing, often times referred to as stereolithography, involves subjecting photo-sensitive polymer resins in thin layers to a laser beam for curing and thence repeating these steps to build up a part. It is generally slow, useful only for nonmetals and tooling, and requires expensive emission control measures because of the odorous materials. It also demands post machining because the surface is not stable during storage, is somewhat brittle, and is size limited.

Prior art laminate forming involves cutting of metal plys, paper, plastic sheets or foam, by use of a laser beam, hot wire or mechanical cutter to make sheet-like cutouts; the cutouts are subsequently assembled to form a unit. Laminate forming first was carried out without a computer graphic guide, the cutter following a mechanical guide. More recently, the prior art has programmed the cutter to follow a computer model or graphic such as shown in U.S. Pat. No. 4,675,825. The latter type of laminate forming has been used to shape metal, but fails to eliminate post-machining of the unit, lacks high structural integrity because of the need to use very thin laminates, is incapable of making complex parts such as intricate engine cylinder heads, manifolds or engine blocks, and is slow due to the high number of handling and finishing operations resulting from the number of laminates.

The requirement of post-machining for state of the art laminate forming is a significant drawback. Machining used for this process works only to cut edges of the thin sheet metal (up to 12 mm) inhibiting full contour machining. When the sheets are assembled, the total surface will be somewhat ragged or stepped, requiring post-machining to obtain acceptable surface finishing. If the laminates are foam, paper or plastic, the same problem remains because of the inability to fully free-form the edges of the material; moreover, foam materials can produce a high degree of porosity in the final surface when assembled.

SUMMARY OF THE INVENTION

It is an object of this invention to rapidly make a contoured part by a more economical sectioned-object machining technique adaptable to the most complex parts, the method resulting in an immediate assembled surface finish that is superior, and the method having little or no disadvantageous manufacturing side effects.

The invention, meeting such object, is in a first aspect a method that comprises: (a) designing a three dimensional solid computer graphic model of the part; (b) sectioning the graphic model into computer graphic members which are selected from blocks and slabs, the sectioning being to facilitate machining access into and penetration of two or more sectioned sides of each graphic member to replicate the interior free-form or substantially hidden surfaces of the model; (c) physically machining a non-graphic physical solid member for each graphic member, the solid member being proportional to and enveloping the respective graphic member, the machining being carried out by accessing two or more sectioned sides of such solid member to carve into and penetrate such sides to at least essentially create contours that meet smoothly between mating solid members; and (d) securing the machined solid members together to replicate the graphic model as a usable unitary part.

Machining or carving is advantageously carried out on opposite sides of each member, such as by CNC milling machines, the thickness of the solid members being in the range of 14–150 mm and each of the solid members having preferably opposed sides which are parallel or skewed with respect to each other.

The method is particularly adaptable to the making of complex internally configured metal functional parts.

BRIEF DESCRIPTION OF THE DRAWINGS

FIG. 2 is a perspective view of a computer graphic model of an engine head design having a single cylinder;

DETAILED DESCRIPTION AND BEST MODE

The method of this invention machines a plurality of stratiform members which together, when assembled, constitute a desired functional part. The stratiform members are relatively thick sections of the part, herein called slabs or blocks (not sheet material), which demand as well as facilitate two-side machining (preferably opposite sides) controlled by computerized three to five axis milling machines. The fabrication time for the part will be significantly reduced and the method will be particularly effective when making a complex, multi-cored cast part such as an engine cylinder head or engine block.

Figure 1:
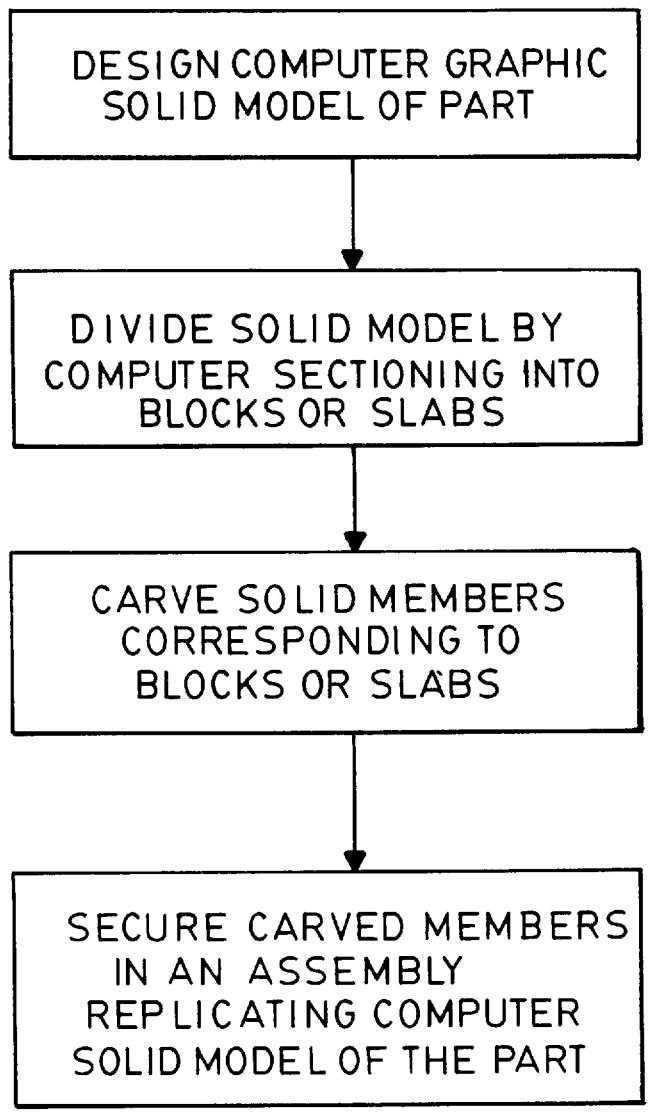
FIG. 1 is a block diagram of a process embodying the principles of this invention.

As shown in FIG. 1, the method comprises four basic steps, the first two of which are carried out in a computer and the third under the control of a programmed computer. The design of the computer graphic/model should be a three dimensional CAD (computer aided design) solid model or fully surfaced model such as the single cylinder engine head shown in FIG. 2. The part to be designed, for which this invention is particularly adapted is one having complex free-form, undercut or substantially hidden interior surfaces.

Figure 2A:
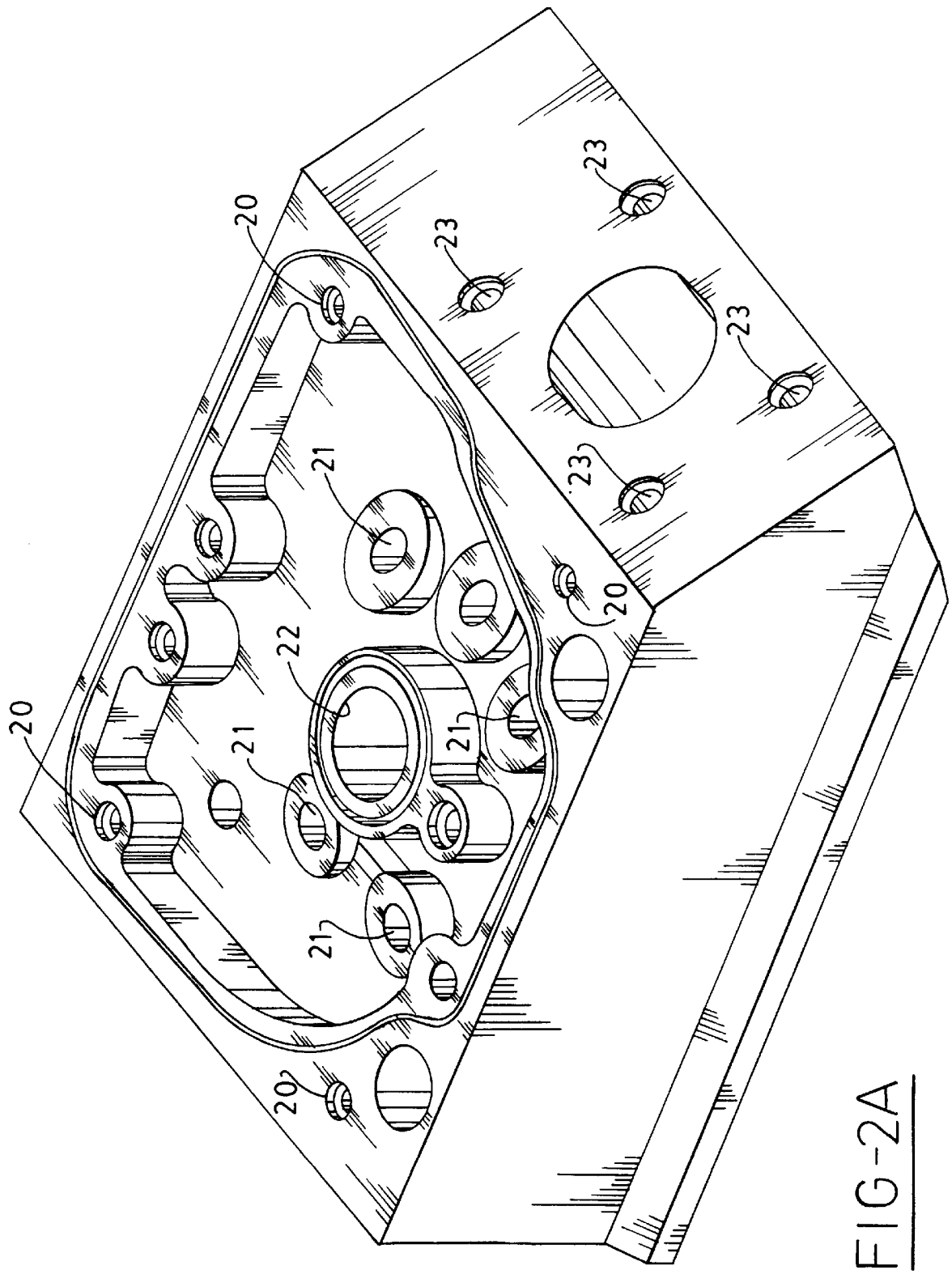
FIG. 2A is a view like 2, but showing additional design work such as bosses, locating holes, or bolt holes.

Constraints must be given to the computer to control the design in certain parameters, such as solid stock size to be machined, direction of machine tool access, and the finish desired on the completed part. The design may also involve the placement of assembly or securing bolt openings which do not interrupt the internal functional cavities as shown in FIG. 2A. In this graphic, the head 10 has a central combustion chamber roof 11, intake passages 14,15, and exhaust passages 12,13, along with a plurality of valve seats 16 for each of the passages. Several bosses are defined including spark plug or fuel injector boss 17, valve guide bosses 18 and joining bosses 19.

Figure 3A:
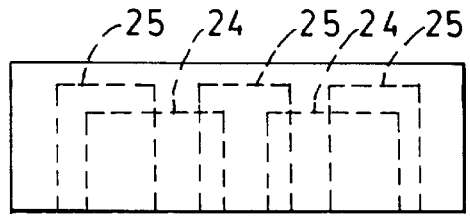
FIG. 3A is a schematic plan for taking sections or slices of the graphic model.
Figure 3B:
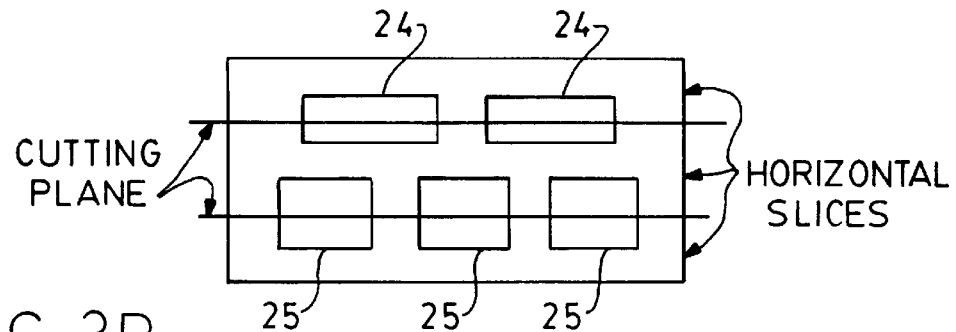
FIG. 3B is an elevational view of FIG. 3A.

It is important to plan the sectioning of the graphic model according to the block or slab concept of this invention, taking into account the location, size and shape of the internal cavities of the part to be produced. The object of sectioning or subdividing is to expose the complex free-form, undercut or hidden interior surfaces so they may be properly exposed for machining by 3–5 axis carving machines that carve into and penetrate the subdividing plane or sectioned sides of the slab or block. For example, as shown in FIGS. 3A and 3B, if the internal cavities 24,25 are located in vertically spaced rows and if the cavities 24,25 widely overlap in plan view, horizontal sectioning through each row of cavities is desirable to expose all of the cavities to proper access by the milling tool. Such sectioning may be constrained by the minimal thickness that can be used to achieve a stable block or slab according to this invention. Such stable minimum thickness is about 14 mm for metals such as aluminum and steel. Such minimum thickness may be adjusted based upon the strength of an alternative material. Such minimum thickness and strength is necessitated by the need for full three axis contour machining, not merely vertical cutting as with sheet metal.

Figure 4A:
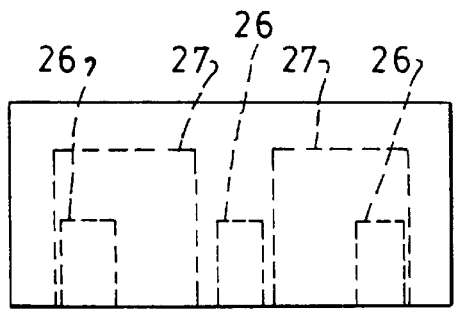
FIG. 4A is schematic elevational view of a plan for taking a combination of both vertical and horizontal slices or sections of the computer model.
Figure 4B:
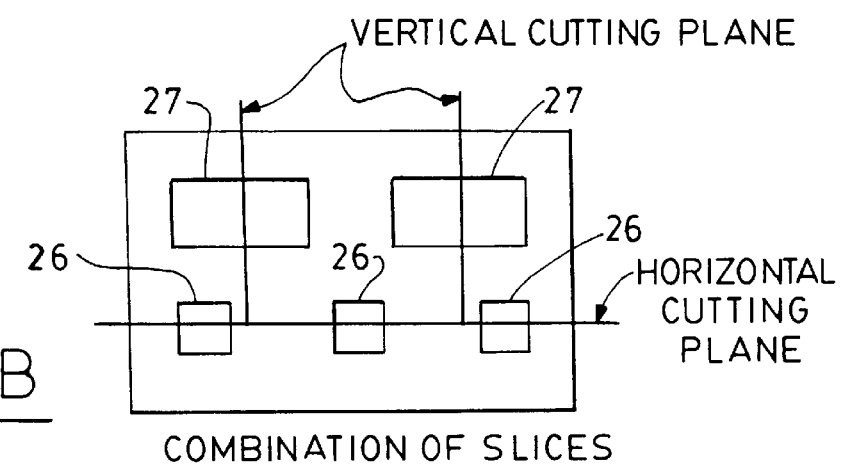
FIG. 4B is a side view of the plan shown in FIG. 4A.
Figure 5:
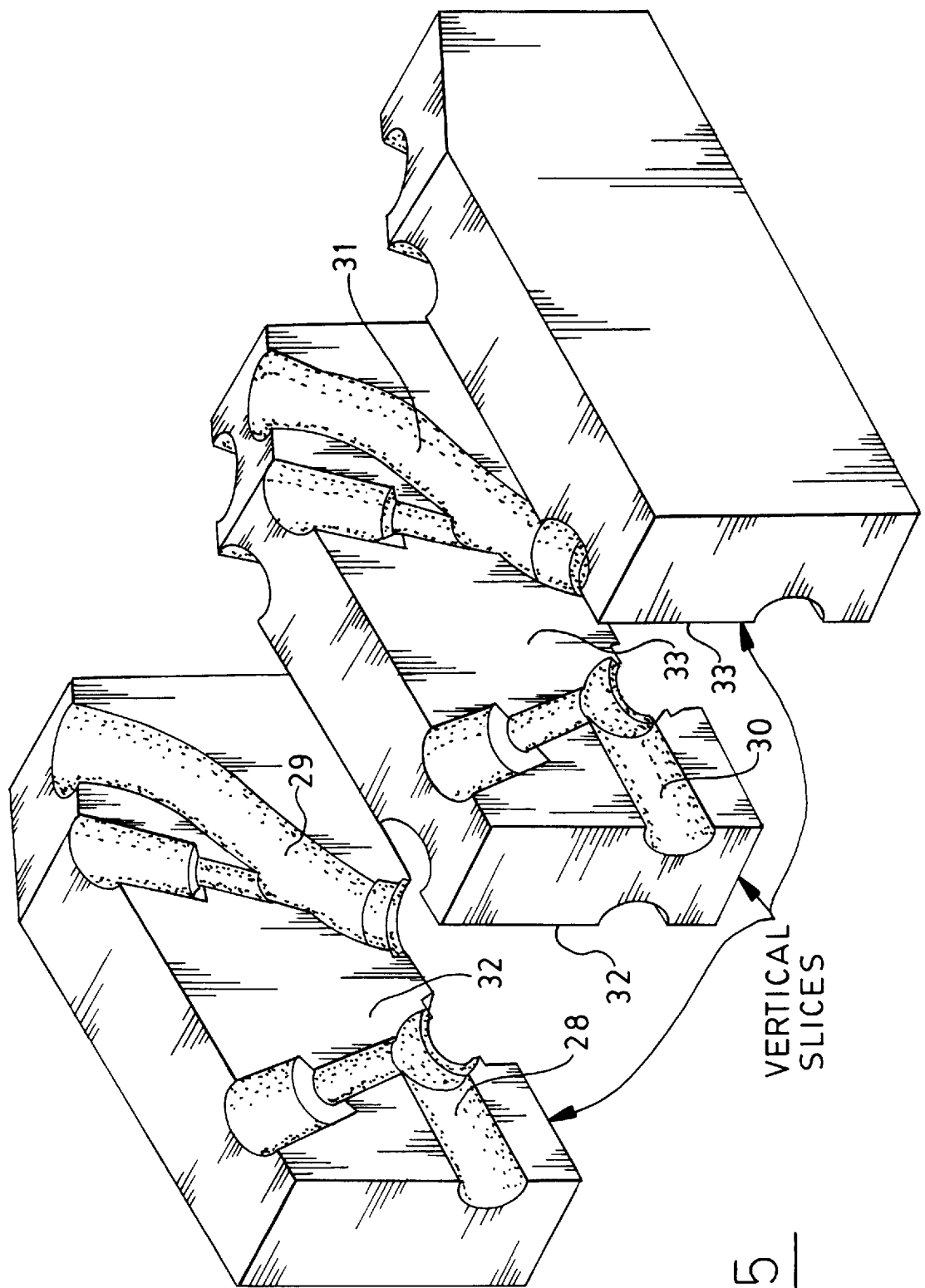
FIG. 5 is an exploded perspective view of selected computer sections of the model of FIG. 2, the sections being selected to facilitate opposite side machining.

It may be practicable, in certain cases, to combine both horizontal and vertical sectioning planes, such as shown in FIGS. 4A and 4B, where the lower series of cavities 26 are enveloped within the plan view of the upper cavities 27. Still another alternative is to utilize only vertical sectioning such as shown in FIG. 5. The ability to expose properly the internal passages 28, 29, 30 and 31 is a criteria by which this sectioning should be selected. Here, such passages are generally in vertical planes 32 and 33.

The slab or block graphic members can and usually do vary in height (section interval between subdividing planes) and may also vary in the orientation of the subdividing plane. Such variation in subdivision is to (i) assure the best machining access to the particular interior surfaces, (ii) avoid tool vector interference (i.e. the tool shank supporting the tool tip) with the slope of adjacent carved surfaces, such as shoulders, and (iii) avoid, if possible, the creation of islands of designed material not attached to any other part of the graphic member. Typically an engine head may be subdivided into 5–8 blocks or slabs to properly expose the interior cavities and reap the benefits of the invention.

During the step of subdividing, it is desirable to define two or more holes that extend through each graphic member between opposite sides or subdividing planes. The holes are sized to snugly receive dowel pins that extend from a supporting fixture used during the cutting step. Such pins provide a dimensional reference to assure accuracy of replication of the computer model in the physical members. In the making of prototype heads, the axes for each of the holes can coincide with the axes for bolt holes which are used to receive bolts that secure the head to an entire block.

Figure 6:
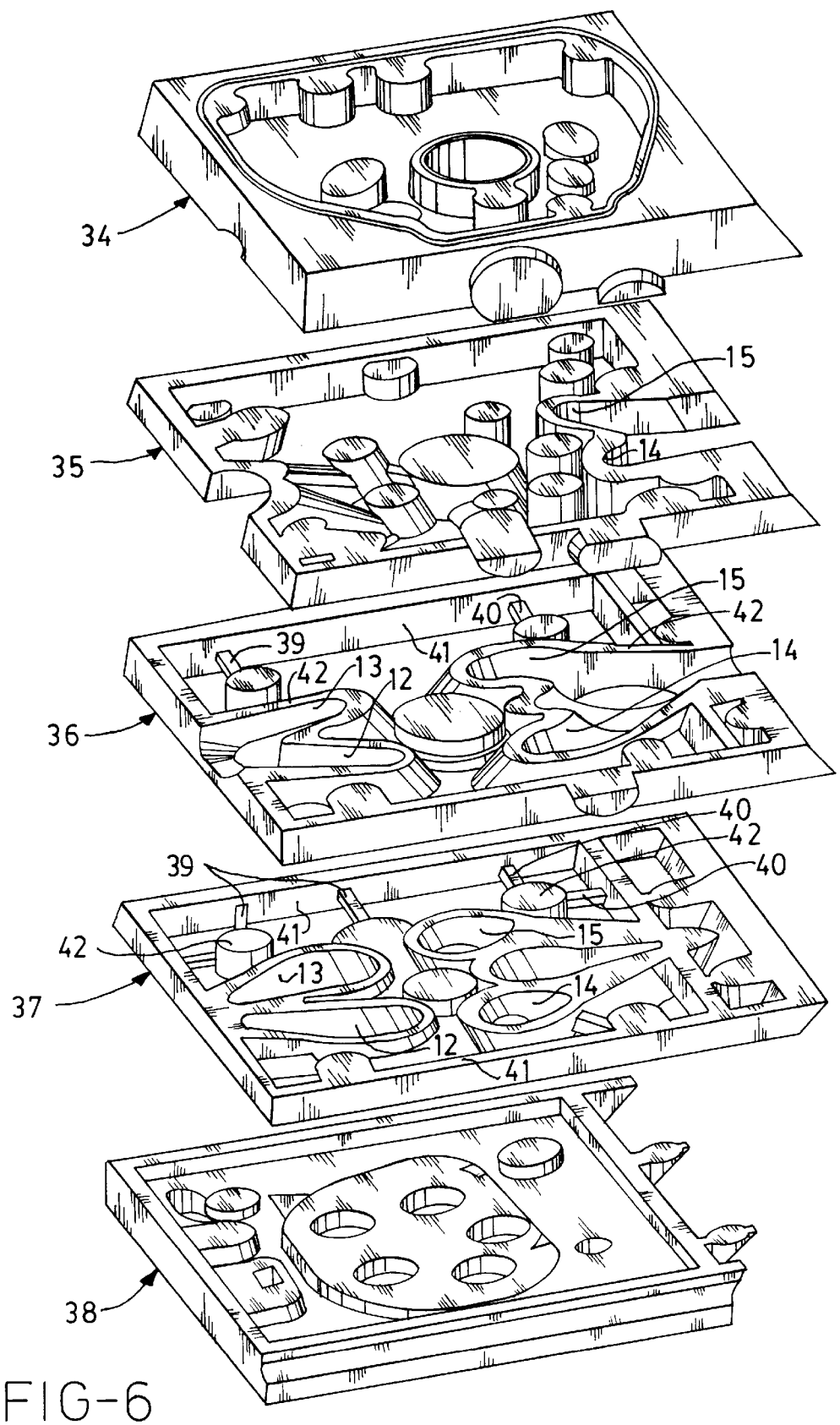
FIG. 6 is an exploded perspective view of computer sections that create slabs of the design shown in FIGS. 2A and 2B.

As shown in FIG. 6, five sections or slices of different but uniform thickness' were determined to optimally expose the interior cavities of the single cylinder engine head model of FIG. 2. The slabs are graphic members 34, 35, 36, 37 and 38. Note the narrow thickness of slab 37, the greater thickness of slabs 35 and 36, and the still greater thickness of slabs 34 and 38. All of the slabs are of generally uniform thickness as a result of parallel horizontal sectioning. The complex contours and unusual shape of the exhaust passages 12,13 and intake passages 14,15 are exposed for three axis machining by the slabs 35–38, leaving no uncarved areas or overhangs. The lack of complex contours in the top and bottom slabs 34,38 allow such slabs to have greater thickness.

The sectioning of the computer graphic model is adapted to provide for overlap between the slabs or graphic members. Such overlapping aspect is necessary to maintain continuity between surfaces. In certain slabs or graphic members, the bosses defining certain cavities may be suspended and detached from the side walls 41 within that particular slab, thus necessitating the use of bridges 39,40 such as shown for slabs 36 and 37; such bridges may be later removed if necessary or desired.

The surface quality of the machined solid members (slabs or blocks) is dependent on the surface requirements, preferably about 0.005 mm when utilizing material such as aluminum or steel. However, the surface finish can be adapted to the material being cut so that it is better than that normally provided by present industrial standards. The solid members (blocks or slabs) to be machined should have a size which is generally equal to or greater than the corresponding graphic member to thereby envelope all sides of the computer graphic member.

Figure 7:
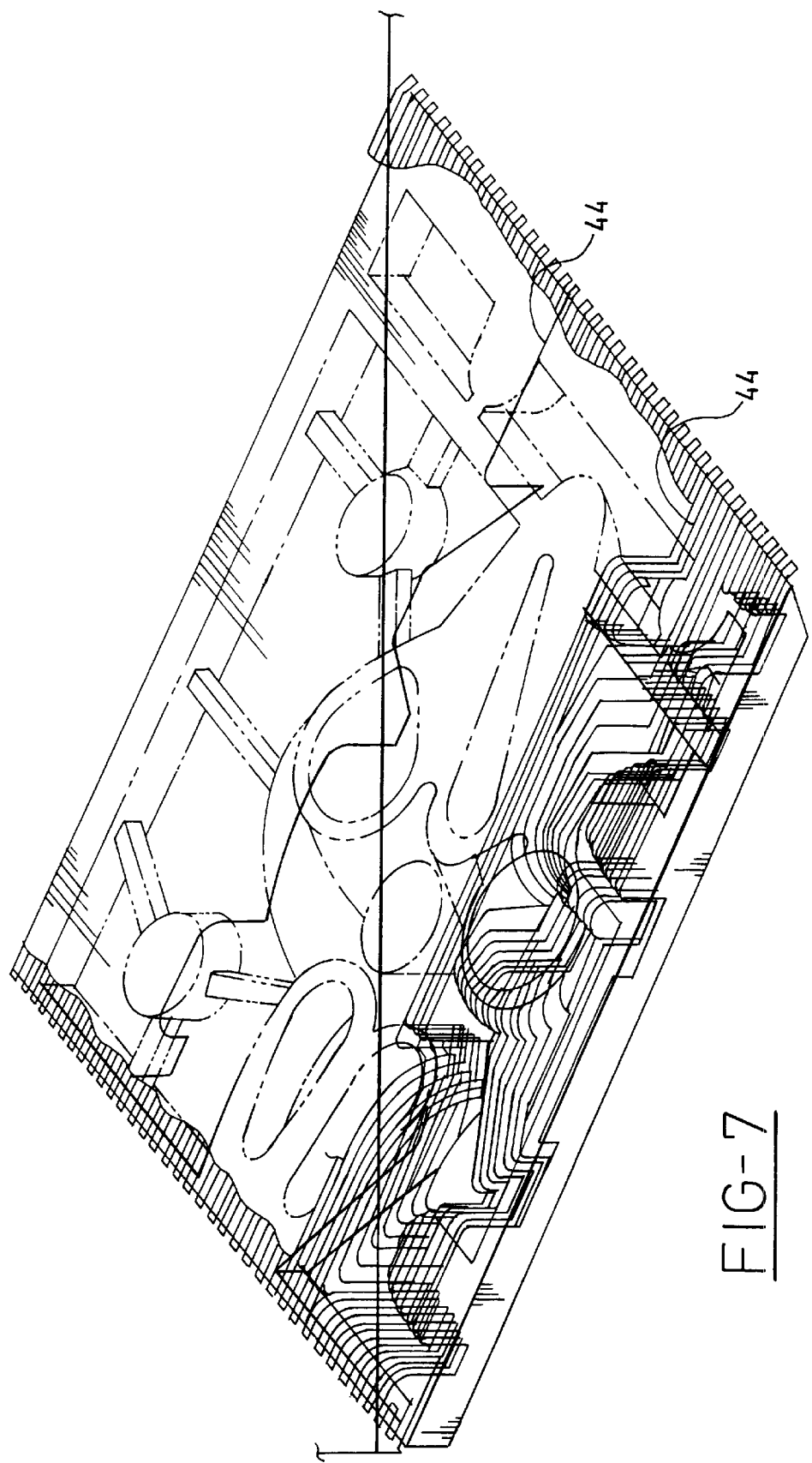
FIG. 7 is a perspective view of the computerized carving path which has been determined to carry out carving of the top side of the fourth graphic member (37) in FIG. 6 and thereby the fourth solid member.
Figure 8:
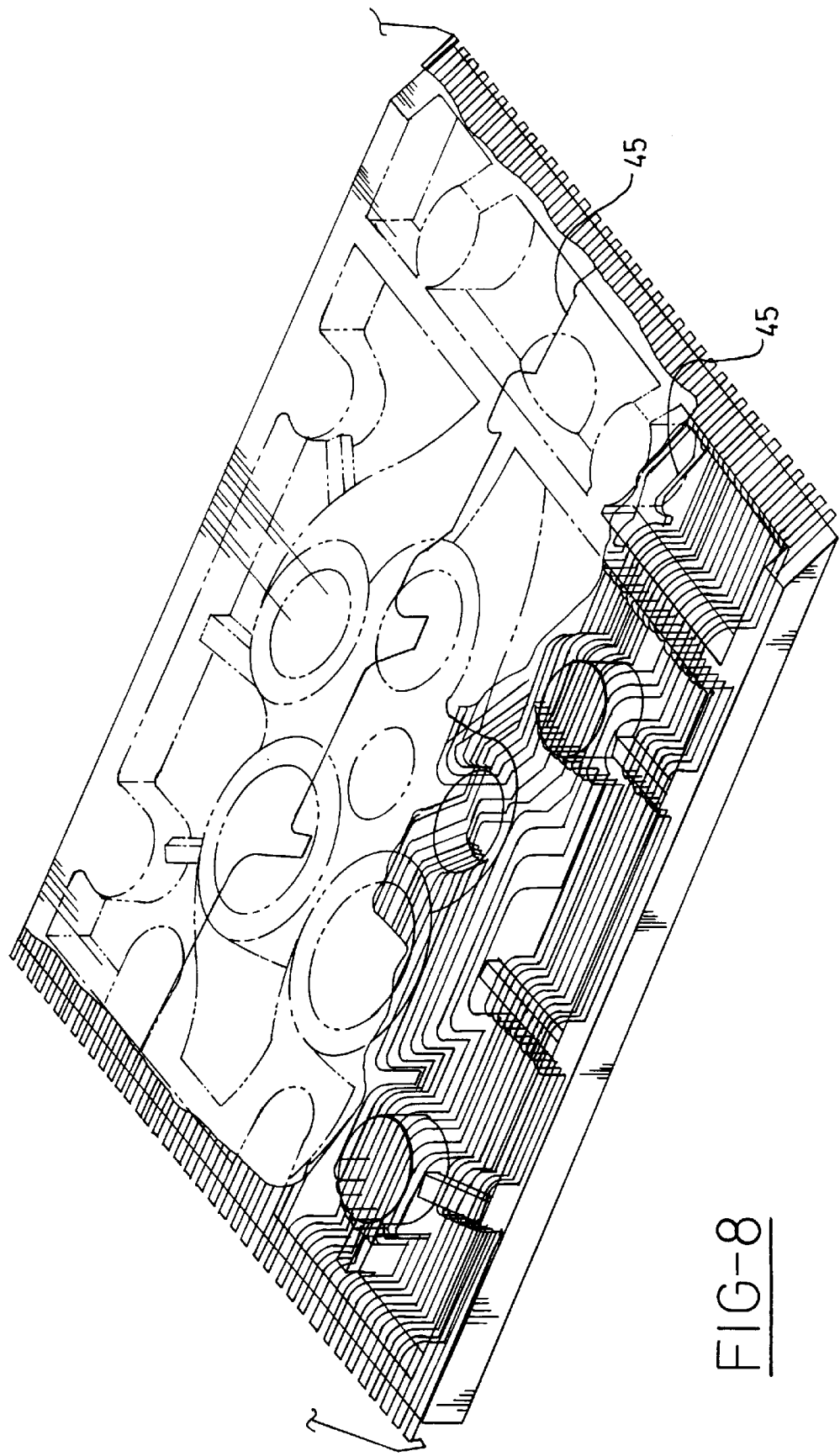
FIG. 8 is a perspective view like that in FIG. 7, but for a carving path for the bottom of the fourth graphic member (37) and thereby the fourth solid member.

Once the solid model has been sectioned into blocks or slabs, tool cutting paths must be derived by the computer program for the plurality of the exposed surfaces that are to be machined in each solid member (block or slab), preferably at the opposed top and bottom surfaces of horizontal sectioned solid members. Tool paths 44,45 for the single cylinder engine head are shown in FIGS. 7 and 8 for member 37. Tool path 44 is for top access to the member shown in FIG. 7, and tool path 45 is for bottom access (the member turned over) to the member shown in FIG. 8. The software that is utilized to derive such tool paths is generally known as Computer Visions®-CAD/CAM system, and consists of solid modeling, numerical control, and drafting. The tool paths, once generated, within the computer, are verified by Vericut® software. It should be noted from reviewing FIGS. 7 and 8, that several return passes of the tool are needed to carry out carving; the interior material that is removed is not cut as a segment to fall away.

Tool path generation may involve first selecting machining phases for each graphic member to achieve enhanced carving productivity, carving quality and tool life; the tool paths for the phases are not necessarily the same, but are customized for the amount of material to be removed. The phases may include: (i) profiling (where the subdividing planes are defined and where reference holes are drilled), (ii) rough machining, (iii) pre-finish machining, and (iv) final finishing. The tool paths are adjusted to work with 3 or 5 axis machine capability. Profiling and rough machining are carried out at a faster material removal rate than the finishing phases. Next the tool characteristics are selected for each phase and carving path which selection may comprise: (a) tool shape determined by the desired type of machining, (b) tool diameter determined by the minimum radius of the surface to be cut, (c) tool length determined by the thickness of the slab or block, (d) the number of tool flutes determined by the desired finish, and (v) tool rake angle as determined by the nature of the material for the physical member being cut. Several tools thus may be used to machine each slab or block. It is desirable to overlap the tool paths for adjacent graphic members to assure accurate and smooth contouring of mating interior surfaces of carved solid members when assembled as a unit.

Figure 9:
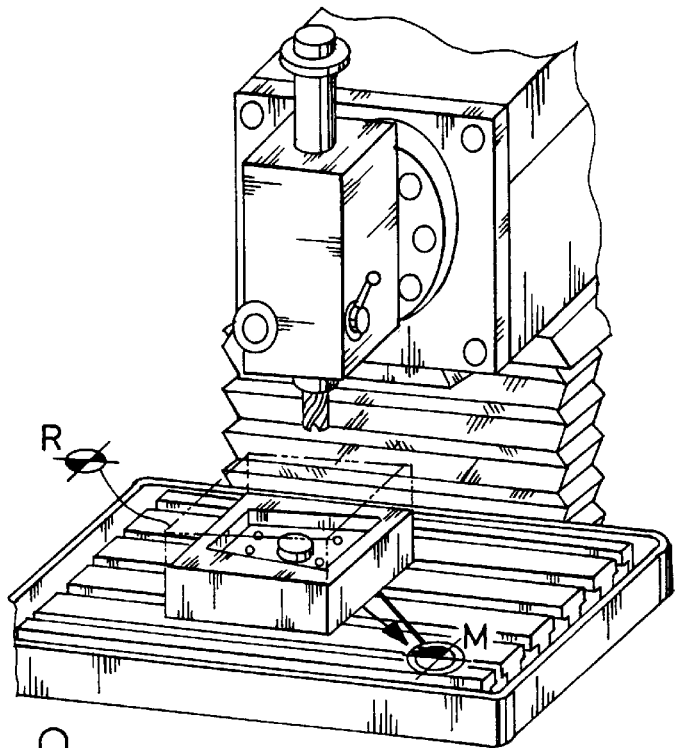
FIG. 9 is a perspective schematic view of a typical three-axis milling machine tool as applied to the carving of the top side of a solid member.

In carrying out the third step of the basic process, CNC milling is utilized to carve the various internal cavities and surfaces of each physical solid member (slab or block) while the solid member is rigidly fixed to the milling machine. Carving is carried out in phases as directed by the CNC program determined earlier in the tool path generation step. The fugitive material block or slab may be profiled (reference holes are drilled and face milling is carried out along the subdividing planes), then the interior surfaces are rough machined, semi-finished and finally finish machined five axis cutting permits thicker slabs or blocks to be used while achieving equivalent or more accurate contouring. It is desirable to drill locating openings for locator pins or alignment pins to facilitate holding or fixturing the solid member during subsequent machining, as shown in FIG. 9. The locator openings and joining openings will also determine the exact reassembly of the solid members (slabs and blocks) as a unit. The bolt holes (that may be utilized to secure the assembly in some cases) should be drilled with precise accuracy. It is important that the milling machine be able to remove material in the X, Y and Z axes to create a duplicate of the graphic model. An example of a CNC milling machine that may be utilized for purposes of carrying out this step of the process is shown in FIG. 9. Although only three axis milling is needed, the method can utilize four or five axis milling also, but it may not be necessary.

Figure 10:
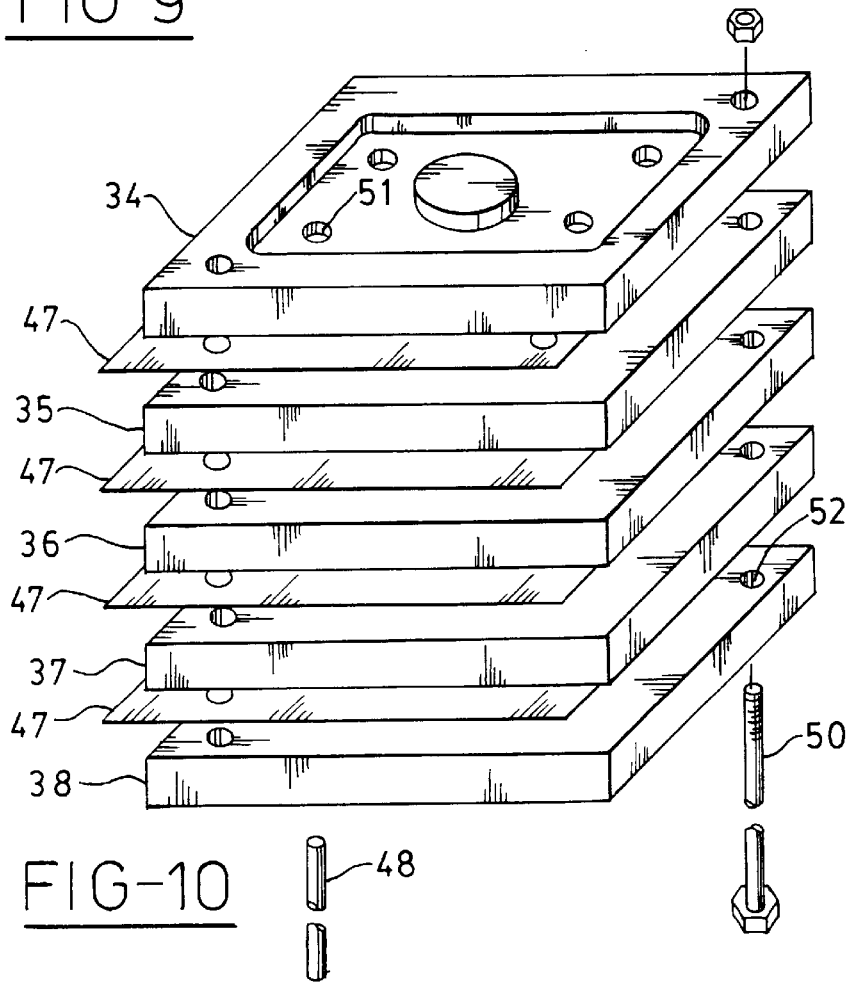
FIG. 10 is an exploded view of the solid members after machining, and as assembled together with brazing sheets therebetween.

In the final step of the basic process, the individual slabs or blocks should be preferably cleaned to remove all oxides in the event that securing is by brazing, soldering, or adhesive requiring some form of substance action. In the example of the single cylinder engine head, the slabs are assembled together after cleaning with brazing foil or sheets 47 superimposed between members 34–38 as shown in FIG. 10; locating pins 48 are introduced to align openings 51 to precisely bring the solid members (slabs) together in the exact location needed to duplicate the graphic model. It is desirable that the securing make the part impervious to fluids at the mating surface without adding bulk or modifying the shape of the assembled slabs or blocks. Additionally, bolts or fasteners 50 may be employed through openings 52 to clamp the assembly together during handling within a furnace used for heat treatment to follow. The brazing material utilized for aluminum alloys is a eutectic aluminum Si—Mg braze foil, having the following chemistry: 83–90% Al, 9–13% Si, 0.1–1.75% Mg, 0–0.15% Bi. The sheets of brazing material have a thickness in the range of 0.003–0.010 inches. If other materials such as cast iron, alloy steels, or Mg alloys are used, a different suitable eutectic brazing or soldering material is used.

After cleaning the assembly, the clamped unit is placed in a furnace in a suitable inert atmosphere, with or without flux, and subjected to a precise heating cycle to complete brazing and effect a metallurgical bond between the brazing material and the slabs themselves. The unit is heated to a temperature that is roughly 30° C. below the melting temperature of the solid members (slab metal) (at about 595° C. for aluminum). A subsequent cooling/heating cycle within the furnace may be used such as a T5 or T6 cycle.

The method of this invention reduces the overall time period for producing a metal part by as much as 30%, reduces cost by typically 50%, and eliminates side effects such as distortion, instability of the assembled unit, brittleness, odorous emissions, limitations as to member material selection, and the need for rotating the solid member while machining. With respect to time reductions, it is now conventional to make metal prototypes by a sequence which involves machining patterns, making a mold, and then casting parts. This will typically take 15 weeks. In contrast, the single cylinder head disclosed in the above description can be designed and produced within 3–4 weeks. The process eliminates waste, reduces the number of steps and personnel needed to perform, and permits use of a variety of materials such as cast iron, magnesium, steel, aluminum, and alloys thereof; all lead to cost reduction.

The resulting product of this method comprises: a stack of solid members (blocks or slabs) secured together in sequence to replicate the three-dimensional computer graphic model of the part, the solid members (blocks or slabs) being prepared by the steps of (i) sectioning a graphic model into graphic members which are blocks and/or slabs, and (ii) carving a non-graphic physical solid member (block or slab) for each of the graphic model members by accessing two or more sectioned sides of the solid members (see FIGS. 6–8) to essentially duplicate the corresponding graphic section members. Such product will possess valuable unique characteristics which comprise structural stability, an outer contoured smooth surface that is not interrupted or stepped from solid member to solid member (block to block or slab to slab), the surface finish and strength of the product being at least as good as that conventionally produced. For the solid members utilized in the basic method, metal is selected as normally required by the functional part. The sectioning must accommodate the condition of the solid member when reduced to stratiforms, while providing access to the designed internal cavities. The product eliminates stack-up errors characteristic of object sectioning using very thin laminations.

Although the preferred embodiment of the present invention has been disclosed, various changes and modifications may be made without departing from the scope of the invention as set forth in the appended claims.

We claim:

1. A method of rapidly producing a contoured part having complex internal free-form or hidden surfaces, comprising:
   (a) designing a 3-D solid computer graphic model of said part and its internal surfaces;
   (b) sectioning said model into computer graphic members which are selected from blocks and slabs, said sectioning being to facilitate machining access into and penetration of two or more section sides of each graphic member to replicate the said free-form or hidden surfaces;
   (c) physically machining non-graphic physical solid members for each of the graphic members, said physical solid member being proportional to and enveloping the respective graphic member, said machining being carried out by accessing said two or more sides to carve into and penetrate said sides and to essentially create contours that meet smoothly between mating solid members; and
   (d) securing said machined solid members together to replicate said graphic model as a functional usable unitary part.

2. The method as in claim 1, in which the sectioning of step (b) produces graphic members having two sides normal to the interval for such sectioning.

3. The method as in claim 1, in which sectioning of step (b) is carried out to provide section planes that expose and intersect complex internal cavities or free-form internal surfaces for providing machining access to such cavities or internal surfaces into or through said section planes.

4. The method as in claim 1, in which sectioning of step (b) is carried out to provide computer graphic bridging to connect and support any graphic material separated from a graphic member as a result of the sectioning.

5. The method as in claim 1, in which step (c) machining tools and tool machining paths are selected to control tracking for each solid member to replicate the contours and surfaces of the respective graphic member with the desired surface finish and desired cycle time.

6. The method as in claim 5, in which said paths are selected for three to five axis physical machining to provide smooth mating of contours between adjacent solid members when secured.

7. The method as in claim 1, in which, in step (c), said physical solid members are constituted of aluminum, or an aluminum based material and, in step (d), securing is carried out by aligning machined physical solid members together to form said part with brazing foils interposed between adjacent members, the assembly being heated to brazing temperature for brazing the physical solid members together.

8. The method as in claim 7, in which said brazing foil is constituted of an aluminum alloy melting below 600° C., said alloy comprising 0.1–1.75% by wt. Mg, 9–13% Si, 0–0.15% Bi, and the remainder aluminum.

9. The method as in claim 8, in which said brazing foil has a thickness of about 0.003–0.01 inches.

10. A method of rapidly producing a part having complex free-form, undercut or hidden internal surfaces, comprising:
   (a) designing a three-dimensional solid computer graphic model of said part and said internal surfaces;
   (b) sectioning said model into computer graphic members which are selected from blocks and slabs, said sectioning being to facilitate machining access into and penetration of two or more section sides of each graphic member to permit machining replication of the internal surfaces;
   (c) within a computer, generating machining tool paths for each graphic member that will replicate said interior surfaces and sectioning planes,
   (d) physically carving a solid non-graphic physical member along said machining tool paths to replicate each graphic member, said machining being carried out by accessing said two or more section sides to carve into and penetrate said sides to create contours that meet smoothly between mating solid members; and;
   (e) securing said machined solid members together to form an assembly that identically replicates said model as a functional usable unitary part.

11. The method as in claims 10, which in step (c) tool path generation is carried out to overlap adjacent mating computer graphic members and in step (d) machining additionally removes the overlapping material to provide exact and smooth mating of the adjacent physical solid members in said assembly.

12. The method as in claim 10 which in step (b), sectioning is carried out to prevent the machining tool vector, as it follows along the machining paths in step (d), from interfering with the slope of machined surfaces.

13. The method as in claim 10, in which in step (b), the thickness of each block or slab is varied to optimize machining access to said interior surfaces, or the orientation of said sectioning planes is selected to optimize machining access to and exposure of said interior surfaces.

14. The method as in claim 10 in which said part is a cylinder head for an automotive internal combustion engine.

15. The method as in claim 10 which in step (d), each physical member is supported on the same permanent fixture for carrying out machining into at least said section plane, said fixture having reference features that assure accurate machining alignment between physical members.

16. The method as in claim 15, in which said reference features are dowel pins which fit within corresponding dowel pin openings designed into the graphic model.

17. The method as in claim 10 in which said sectioning comprises a combination of both vertical and horizontal planes.

18. The method as in claim 10 in which, in step (c), said tool paths are generated by first selecting tool characteristics for each path, said characteristics comprising one or more of: (i) tool shape determined by the desired type of machining, (ii) tool diameter determined by the minimum radius of the surface to the cut, (iii) tool length determined by the thickness of the slab or block, (iv) the number of tool flutes determined by the desired surface finish, and (v) tool rake angle as determined by the nature of the material of which the physical members are constituted.

19. The method as in claim 10 in which, in step (d), machining is carried out in repetitive phases along the same machining paths, said phases comprising sequentially (i) profiling the section planes by rough machining, (ii) rough machining the interior surfaces, (iii) pre-finishing the interior surfaces, and (iv) final surface finishing of the interior surfaces and sectioning planes.

20. The method as in claim 19 in which said rough machining is carried out at a faster feed rate than said finishing machining.

* * * * *